Feb. 14, 1961          W. STICH          2,972,043
RESISTANCE HEATING PROCESS AND APPARATUS
Filed Oct. 8, 1956
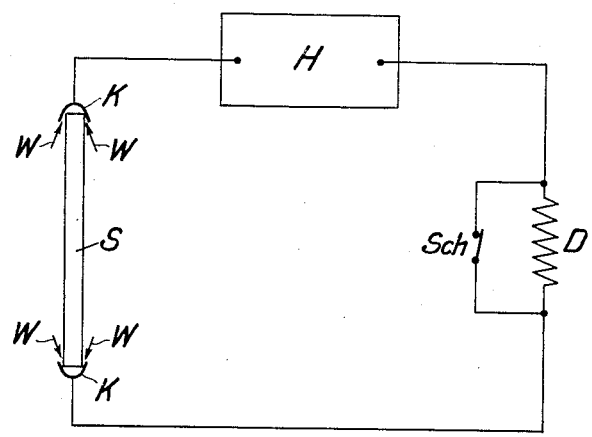
Inventor:
Wilhelm Stich
By Michael S. Striker _United States Patent Office_

2,972,043
Patented Feb. 14, 1961

2,972,043

RESISTANCE HEATING PROCESS AND APPARATUS

Wilhelm Stich, Bochum, Germany, assignor to Bochumer Verein fuer Gusstahlfabrikation Aktiengesellschaft, a corporation of Germany Filed Oct. 8, 1956, Ser. No. 614,565

8 Claims. (Cl. 219—156)

The present invention relates to heating processes and apparatus, and more particularly to a process and apparatus for the resistance heating of elongated electrically conductive workpieces such as steel billets or similar semi-finished pieces.

One of the objects of the present invention is to provide a process and apparatus capable of heating a workpiece such as a steel billet up to a temperature suitable for rolling, for example, in an extremely short time as compared to the length of time required with a conventional process and apparatus for heating such a workpiece.

A further object of the present invention is to heat the workpiece in such a way that the workpiece does not have localized portions where the temperature of the workpiece is undesirably greater than the temperature of the remainder of the workpiece.

An additional object of the present invention is to apply a relatively intense heat to a workpiece without causing any portions thereof to become upset, without undesirably influencing the grain structure of the workpiece, and without causing any part of the outer surface of the workpiece to melt.

With the above objects in view the present invention mainly consists of a process for resistance heating elongated electrically conductive workpieces such as steel billets and other similar semi-finished members, this process including the steps of applying a pair of contacts to the ends of the workpiece and conducting a high current therethrough in order to heat the workpiece rapidly, and applying a cooling fluid to the ends of the workpiece at least during a part of the time that it is heated by the passage of current therethrough.

When elongated electrically conductive workpieces such as steel billets or the like are heated by passing an electrical current therethrough up to relatively high temperatures such as those required for rolling, the application of the electrical contacts to the workpiece in order to place the latter in the electrical circuit is of great significance. In accordance with the present invention elongated steel bars of every type, such as billets or tubes, are resistance heated by passing a current therethrough while a pair of contacts are respectively pressed against the ends of the workpiece, these contacts preferably engaging only part of the end faces of the workpiece, and according to the invention a cooling fluid such as water is applied steadily or intermittently to the ends of the workpiece after the beginning of the heating thereof.

As a result, it is possible to shorten the time required for heating steel bars, such as billets which are to be rolled, to a relatively high temperature, since it is possible because of the cooling to apply a very high powered source of electricity to the workpiece. Without such cooling, such a high powered source of electricity would produce a localized overheating at the portions of the workpiece engaged by the contacts, so that as a result of the pressure with which the contacts are applied to the ends of the workpiece, upsetting of the latter occurs and furthermore an undesirable grain structure forms at the ends of the workpiece and part of the surface of the latter may be raised to a melting temperature.

The cooling fluid such as water may be applied during the entire heating time or during only a part of the heating time. The amount of cooling fluid and the time during which it is applied can be made dependent upon the manner in which the portions of the workpiece other than the parts thereof in direct engagement with the contacts become heated, and suitable automatic controls may be provided for this purpose. The cooling fluid such as water can be supplied to the workpiece in different ways, but the structure for supplying the cooling fluid must be capable of cooling the surfaces of the workpiece which engage the contacts to a sufficient extent and the cooling should be limited as much as possible to the workpiece surfaces engaged by the electrical contacts. For example, it has been found advantageous to apply the cooling fluid to the end of the workpiece from a spray nozzle which directs the cooling fluid toward the exterior of the electrical contact from the interior thereof and against an end face of the workpiece engaged by the contact, and to simultaneously spray cooling fluid against the surface of the workpiece at the portions thereof located next to and outside of each electrical contact from above and from a spray apparatus of substantially horseshoe configuration shortly after the beginning of the heating in order to provide a particularly intense cooling. After a short time the spraying of the workpiece with a cooling fluid at the exterior of the electrical contacts is terminated and the spraying from the nozzles in the interior of the electrical contacts is continued until the end of the heating process. The effectiveness of this type of direct cooling has proved to be so great that it can be advantageously used for all types of contact surfaces. When the cooling fluid is a liquid such as water, it is advantageous to apply the same in a finely divided state. The cooling liquid may be in vapor form before it engages the surface to be cooled.

According to the process of the invention it is also possible to raise the workpiece by electrical resistance heating to the desired high temperature in an extremely short time if the workpiece is first preheated.

It may happen that undesirably great differences in temperature are produced between the portions of the workpiece engaged by the electrical contacts and directly cooled and other portions of the workpiece, and the interior of the workpiece adjacent its ends start to melt because with the above type of heating the temperature at the interior of the workpiece rises at a greater rate than at its outer surface. Such undesirable temperature differences at or adjacent the ends of the workpiece can be eliminated or reduced according to the invention by interrupting the heating of the workpiece for a short time or by reducing the intensity of the current which passes through the workpiece. In this way the desired substantially uniform temperature throughout the workpiece can be obtained in a few seconds. The reduction in the intensity of the heating can advantageously take place by reducing the current through the medium of an induction coil, for example, which may be connected into the electrical circuit.

According to the invention steel bars such as billets or the like may have the heating current passed therethrough after such workpieces are preheated to a relatively high temperature of, for example, 500–600° C. The preheating can be provided with heat obtained from a gas burner or the workpiece can be preheated in an oven fired by gas or a carbonaceous material such as coal, coke, or charcoal. During the preheating of the workpiece, the temperature at which the latter starts to form scale should not be exceeded at all or this temperature may be exceeded to a relatively small degree.

As a result of such preheating, the application of the contacts to the workpiece is facilitated since the ends of the preheated workpiece adapt themselves easily to the electrical contacts, and also the time required for heating the workpiece by electrical resistance is reduced. Moreover, the manner in which the ends of the workpiece adapt themselves to the contacts between which the workpiece is pressed can be accurately regulated by the cooling fluid so that undesired upsetting as a result of the pressure of the contacts against the workpiece is avoided. Electrically heating such workpieces from 500–600° C. to a temperature suitable for rolling, for example, such as a temperature of 1050–1100° C. in the case of steel takes place in an extremely short time such as, for example, 30–60 seconds for billets.

As a result of preheating of the workpieces before the electrical structure is applied thereto, this electrical structure can handle many more workpieces in a given period of time so that the amount of equipment required is reduced, and in spite of the use of essentially inexpensive heat from gas or carbonaceous materials, scaling is almost completely avoided, and clean, crack-free outer surfaces are obtained.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing.

As is schematically shown in the drawing, one possible apparatus according to the invention for carrying out a process as described above includes a unit H capable of providing a very high electrical current to the contacts K when the circuit through the latter is completed by the electrically conductive workpiece S against whose ends the contacts K are respectively pressed. Conduits W serve to supply the cooling fluid such as water to the ends of the workpiece, and an induction coil D is located in the electrical circuit but is cut out of the latter during the times when the full heating power is applied by the short circuit connection Sch.

It will be understood that each of the elements described above, or two or more together, may also find a useful application in other types of heating processes differing from the types described above.

While the invention has been illustrated and described as embodied in resistance heating process and apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A process for resistance heating elongated electrically conductive workpieces such as steel billets and other similar semi-finished members to a substantially even elevated temperature throughout the entire workpiece, comprising the steps of applying a pair of contacts to the ends of the workpiece and conducting a high current through the same in order to heat the workpiece rapidly, whereby more heat is developed in end portions of said workpiece located adjacent said contacts than in commensurate portions of said workpiece which are farther distant from said contacts; and applying a cooling fluid to said end portions of said workpiece at least during a part of the time that it is heated by the passage of said current therethrough so as to absorb a portion of the heat developed in said end portions and to cool the same sufficiently to substantially maintain an even temperature throughout the entire length of said workpiece.

2. A process for resistance heating elongated electrically conductive workpieces such as steel billets and other similar semi-finished members to a substantially even elevated temperature throughout the entire workpiece, comprising the steps of applying a pair of contacts to the ends of the workpiece and conducting a high current through the same in order to heat the workpiece rapidly, whereby more heat is developed in end portions of said workpiece located adjacent said contacts than in commensurate portions of said workpiece which are farther distant from said contacts; and applying a cooling fluid to said end portions of said workpiece in an amount and for a length of time correlated with the heating of the workpiece so as to absorb a portion of the heat developed in said end portions and to cool the same sufficiently to substantially maintain an even temperature throughout the entire length of said workpiece.

3. A process for resistance heating elongated electrically conductive workpieces such as steel billets and other similar semi-finished members to a substantially even elevated temperature throughout the entire workpiece, comprising the steps of applying a pair of contacts to the ends of the workpiece and conducting a high current through the same in order to heat the workpiece rapidly, whereby more heat is developed in end portions of said workpiece located adjacent said contacts than in commensurate portions of said workpiece which are farther distant from said contacts; and applying cooling water in vapor form to said end portions of said workpiece at least during a part of the time that it is heated by the passage of said current therethrough so as to absorb a portion of the heat developed in said end portions and to cool the same sufficiently to substantially maintain an even temperature throughout the entire length of said workpiece.

4. A process for resistance heating elongated electrically conductive workpieces such as steel billets and other similar semi-finished members to a substantially even elevated temperature throughout the entire workpiece, comprising the steps of applying a pair of contacts to the ends of the workpiece and conducting a high current through the same in order to heat the workpiece rapidly, whereby more heat is developed in end portions of said workpiece located adjacent said contacts than in commensurate portions of said workpiece which are farther distant from said contacts; applying a cooling fluid to said end portions of said workpiece at least during a part of the time that it is heated by the passage of said current therethrough so as to absorb a portion of the heat developed in said end portions and to cool the same sufficiently to substantially achieve an even temperature throughout the entire length of said workpiece; and reducing the amount of current applied to the workpiece during a part of the time it is heated in order to prevent the temperature of the workpiece at the portions thereof adjacent said contacts from being undesirably greater than the temperature of the remainder of the workpiece.

5. A process for resistance heating elongated electrically conductive workpieces such as steel billets and other similar semi-finished members to a substantially even elevated temperature throughout the entire workpiece, comprising the steps of applying a pair of contacts to the ends of the workpiece and conducting a high current through the same in order to heat the workpiece rapidly, whereby more heat is developed in end portions of said workpiece located adjacent said contacts than in commensurate portions of said workpiece which are farther distant from said contacts; applying a cooling fluid to said end portions of said workpiece at least during a part of the time that it is heated by the passage of said current therethrough so as to absorb a portion of the heat developed in said end portions and to cool the same sufficiently to substantially achieve an even temperature throughout the entire length of said workpiece; and connecting an induction coil into the circuit in which the workpiece is located at least during a part of the time that the workpiece is heated in order to prevent the temperature of the workpiece at the portions thereof adjacent said contacts from being undesirably greater than the temperature of the remainder of the workpiece.

6. Apparatus for resistance heating elongated electrically conductive workpieces such as steel billets and other similar semi-finished members, comprising, in combination, a pair of electrical contacts adapted to engage the ends of the workpiece; means connected electrically with said contacts for cooperating with the latter to pass a high current through the workpiece in order to heat the latter, said means including an induction coil adapted to be placed in and removed from the electrical circuit in which said contacts are located in order to reduce and increase the intensity of the current passing through the workpiece, respectively; and means located adjacent said contacts when they engage the ends of the workpiece for applying a cooling fluid to said ends of the workpiece.

7. A process for resistance heating an elongated steel member to a substantially even elevated temperature throughout the entire workpiece, comprising the steps of subjecting said steel member to contact with heating gases so as to preheat the same up to a temperature of 500–600° C.; applying a pair of contacts to the end portions of the preheated member and conducting a high current therethrough in order to heat said member rapidly, whereby more heat is developed in end portions of said workpiece located adjacent said contacts than in commensurate portions of said workpiece which are farther distant from said contacts; and applying a cooling fluid to the end portions of said member at least during a part of the time that it is heated by the passage of current therethrough so as to absorb a portion of the heat developed in said end portions and to cool the same sufficiently to substantially maintain an even temperature throughout the entire length of said workpiece.

8. A process for resistance heating elongated electrically conductive workpieces such as steel billets and other similar semi-finished members to a substantially even elevated temperature throughout the entire workpiece, comprising the steps of applying the heat of a gas burner to the workpiece to preheat the same to a given temperature; applying a pair of contacts to the end portions of the preheated workpiece and conducting a high current through the same in order to heat the workpiece rapidly, whereby more heat is developed in end portions of said workpiece located adjacent said contacts than in commensurate portions of said workpiece which are farther distant from said contacts; and applying a cooling fluid to said end portions of said workpiece at least during a part of the time that it is heated by the passage of said current therethrough so as to absorb a portion of the heat developed in said end portions and to cool the same sufficiently to substantially maintain an even temperature throughout the entire length of said workpiece.

References Cited in the file of this patent

UNITED STATES PATENTS

| | | |
|---|---|---|
| 458,176 | Lemp | Aug. 25, 1891 |
| 1,979,111 | Kalschne | Oct. 30, 1934 |
| 2,011,926 | Birmingham | Aug. 20, 1935 |
| 2,231,695 | Vedder | Feb. 11, 1941 |
| 2,248,280 | Nobiron | July 8, 1941 |
| 2,325,479 | Crawford | July 27, 1943 |
| 2,400,472 | Strickland | May 14, 1946 |
| 2,581,774 | Stone | Jan. 8, 1952 |
| 2,678,370 | Deneen | May 11, 1954 |
| 2,841,692 | Seulen | July 1, 1958 |

FOREIGN PATENTS

| | | |
|---|---|---|
| 564,879 | Great Britain | Oct. 17, 1944 |
| 569,996 | Great Britain | June 18, 1945 |
| 722,846 | Great Britain | Feb. 2, 1955 |